July 12, 1966 L. SMACZNY 3,260,462
DRINKING TUBE
Filed April 14, 1964
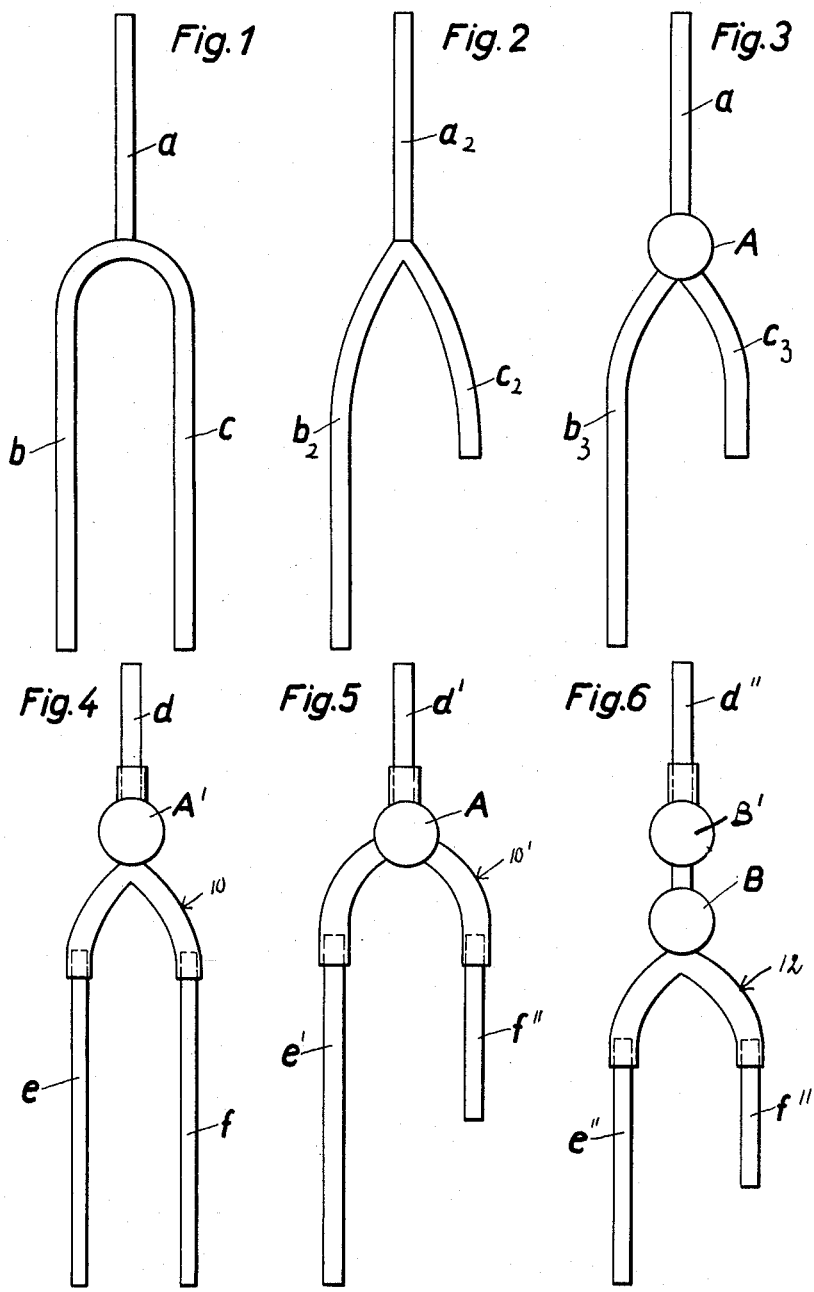
Inventor:
LEONHARD SMACZNY

United States Patent Office

3,260,462
Patented July 12, 1966

3,260,462
DRINKING TUBE
Leonhard Smaczny, Menner Strasse 46, Warburg,
Westphalia, Germany
Filed Apr. 14, 1964, Ser. No. 359,617
Claims priority, application Germany, Apr. 17, 1963,
S 84,721
4 Claims. (Cl. 239—33)

This invention relates in general to devices for withdrawing liquids from containers and in particular to a new and useful drinking tubule of the construction permitting the simultaneous withdrawal of liquids from more than one container.

Most known mixed or blended drinks, for instance milk or fruit juice, cannot be stored in mixed conditions because the mixtures, due to fluctuation of albumin, are stable only for a very short time. The present invention provides means for drinking from a plurality of containers simultaneously such as, for example, drinking an unmixed milk with the desired addition of fruit juice or other liquid with the mixing taking place in a drinking tubule constructed in accordance with the invention.

In accordance with the invention there is provided a drinking tube which includes a lower portion which is forked or bifurcated with each bifurcated portion being adapted to be inserted into a separate container. The construction is such that liquid may be sucked upwardly through the tube simultaneously. In a preferred arrangement, the tube includes at least one central mixing portion located adjacent the juncture of the leg portions of the bifurcated end with the central mouthpiece portion for effecting a mixing of the liquids that are sucked up from separate containers.

Accordingly, it is an object of this invention to provide an improved drinking device permitting the simultaneous emptying of more than one container.

A further object of the invention is to provide a drinking tube having means for mixing a plurality of liquids.

A still further object of the invention is to provide a drinking device, which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a side elevational view of a drinking tube constructed in accordance with the invention; and FIGS. 2–6 are views similar to FIG. 1 of other embodiments of the invention.

Referring to the drawings in particular, the invention embodied therein in FIG. 1 includes a central mouthpiece portion $a$ and a bifurcated portion with legs $b$ and $c$. The bifurcated leg portions $b$ and $c$ join the central mouthpiece portion $a$ and communicate internally therewith. The device may be used by inserting one leg $b$ into one container and another leg $c$ into another container and withdrawing the liquid by sucking upwardly through the mouthpiece portion $a$.

In the embodiment of FIG. 2, leg $c_2$ is made shorter than legs $a_2$ and $b_2$ and the bifurcated portion is angular rather than curved at the juncture to the mouthpiece portion $a_2$.

In the embodiment of FIG. 3, there is provided a shortened leg portion $c_3$, which is shortened as in the embodiment of FIG. 2. The device includes a central substantially cylindrical or disc-shaped mixing chamber portion A. The liquids are drawn upwardly through the tube $b_3$ and $c_3$ and swirled and mixed together in chamber A before they enter the mouthpiece tube $a$.

In the embodiment of FIG. 4, a multi-container drinking tubule is indicated which includes a mouthpiece portion $d$ which is connected to bifurcated leg portions $e$ and $f$ through a central separate connecting piece generally designated 10. The separate connecting piece 10 includes a swirl chamber portion A′, which provides means for creating a whirl to accelerate the liquids which are drawn upwardly through the tube portions $e$ and $f$ to cause a blending of the liquids before they enter the mouthpiece tube $d$.

In FIG. 5, a central bifurcated connecting piece 10′ is employed and in this embodiment a leg portion $f'$ is made shorter than the leg portion $e'$.

In FIG. 6, a central connecting portion 12 is provided which includes two separate connecting chambers B and B′ providing a double mixing chamber for the liquids which are drawn upwardly through each of the tubes $e''$ and $f''$ into the mouthpiece tube $d''$.

The drinking tube of the invention may advantageously be constructed of an inexpensive material such as a metal or plastic.

While specific embodiments of the invention have been shown and described in detail to illustrate the application of the inventive principles, it will be understood that the invention may be embodied otherwise without departing from such principles.

What is claimed is:

1. A drinking tube comprising a central tubular mouthpiece portion and a forked portion connected to said mouthpiece portion, said forked portion comprising a plurality of tubular elements communicating interiorly with the interior of said central mouthpiece portion and adapted to be positioned in separate containers for the withdrawing of liquids upwardly through the tubular elements to said central mouthpiece portion, and a mixing chamber portion disposed in the vicinity of the juncture of said mouthpiece portion and said forked portion, said mixing chamber portion having curved interior walls for effecting the whirling movement of liquids therein.

2. A drinking tube comprising a central tubular mouthpiece portion, a cylindrical mixing chamber portion formed at one end of said tubular mouthpiece portion, and bifurcated leg portions connected to the opposite end of said cylindrical mixing chamber and arranged for directing liquid tangentially into said mixing chamber portion upon drawing up of liquid through said mouthpiece portion.

3. A drinking tube comprising a central tubular mouthpiece portion, a first cylindrical mixing chamber portion formed at one end of said tubular mouthpiece portion, bifurcated leg portions connected to the opposite end of said cylindrical mixing chamber and arranged for directing liquid tangentially into said mixing chamber portion upon drawing up of liquid through said mouthpiece portion, and a second mixing chamber portion formed at the location in said mouthpiece portion adjacent said first mixing chamber portion.

4. A drinking tube comprising a central tubular mouthpiece portion, a cylindrical mixing chamber portion formed at one end of said tubular mouthpiece portion, a bifurcated leg portion connected to the opposite end of said central mixing portion and arranged for directing liquid tangentially into said mixing chamber portion upon drawing up of liquid through said mouthpiece portion, said central mixing chamber portion comprising a separate element having a tubular extension at one end for connecting into said mouthpiece portion and two tubular extensions at the opposite end for connecting respective bifurcated leg portions.

(References on following page)

References Cited by the Examiner

UNITED STATES PATENTS

| | | | |
|---|---|---|---|
| 673,488 | 5/1901 | Waterman et al. | 46—6 |
| 1,151,869 | 8/1915 | Freeburg | 239—33 |
| 2,366,103 | 12/1944 | Hagopian | 46—6 |
| 2,547,362 | 4/1951 | Berry | 239—33 |
| 2,558,645 | 6/1951 | Docter | 239—33 |
| 2,570,366 | 10/1951 | Mitchell | 239—33 |
| 2,587,895 | 3/1952 | Quinn et al. | 46—7 |

M. HENSON WOOD, Jr., *Primary Examiner.*

R. STROBEL, *Assistant Examiner.*